US011961482B2

(12) United States Patent
Lu et al.

(10) Patent No.: US 11,961,482 B2
(45) Date of Patent: Apr. 16, 2024

(54) PIXEL CIRCUIT HAVING A RESET SUB-CIRCUIT FOR RESETTING A PLURALITY OF SUB-PIXELS AND DRIVING METHOD THEREOF

(71) Applicant: HKC CORPORATION LIMITED, Shenzhen (CN)

(72) Inventors: Zhaoyang Lu, Shenzhen (CN); Haoxuan Zheng, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 18/069,376

(22) Filed: Dec. 21, 2022

(65) Prior Publication Data

US 2024/0071321 A1 Feb. 29, 2024

(30) Foreign Application Priority Data

Aug. 30, 2022 (CN) ........................ 202211046891.5

(51) Int. Cl.
*G09G 3/3291* (2016.01)
*G09G 3/3266* (2016.01)

(52) U.S. Cl.
CPC ......... *G09G 3/3291* (2013.01); *G09G 3/3266* (2013.01); *G09G 2300/0452* (2013.01); *G09G 2310/061* (2013.01)

(58) Field of Classification Search
CPC .................................................... G09G 3/3291
USPC ............................................................ 345/76
See application file for complete search history.

(56) References Cited

U.S. PATENT DOCUMENTS

| | | | | |
|---|---|---|---|---|
| 2016/0104419 A1* | 4/2016 | Chung | G09G 3/3225 345/78 |
| 2021/0280130 A1* | 9/2021 | Wang | G09G 3/3233 |
| 2023/0074010 A1* | 3/2023 | Yu | G09G 3/3233 |

FOREIGN PATENT DOCUMENTS

| | | |
|---|---|---|
| CN | 111192557 A | 5/2020 |
| CN | 211376152 U | 8/2020 |
| CN | 114627817 A | 6/2022 |
| CN | 114639341 A | 6/2022 |

OTHER PUBLICATIONS

Office Action dated Jun. 5, 2023, in corresponding Chinese Application No. 202211046891.5, 26 pages.

* cited by examiner

*Primary Examiner* — Long D Pham
(74) *Attorney, Agent, or Firm* — Maier & Maier, PLLC

(57) ABSTRACT

A pixel circuit and a pixel drive method. The pixel circuit includes at least two sub-pixel drive sub-circuits, the sub-pixel drive sub-circuits include an input component, a compensation component, a drive component, a first light-emitting control component and a first light-emitting element, the input component is configured to receive a data voltage signal and a first scan signal. The compensation component is configured to receive a second scan signal. The first light-emitting control component is configured to receive a power supply signal and a first control signal. An output of the drive component in the plurality of sub-pixel drive sub-circuits is coupled to an output of a first reset sub-circuit, and the first reset sub-circuit is configured to receive an initial voltage signal and a third scan signal.

13 Claims, 8 Drawing Sheets

PIXEL CIRCUIT HAVING A RESET SUB-CIRCUIT FOR RESETTING A PLURALITY OF SUB-PIXELS AND DRIVING METHOD THEREOF

CROSS-REFERENCE TO RELATED APPLICATION

Pursuant to 35 U.S.C. § 119 and the Paris Convention, this application claims the benefit of Chinese Patent Application No. 202211046891.5 filed on Aug. 30, 2022, the content of which is incorporated herein by reference.

FIELD

The present application relates to the field of display technology, and in particular, to a pixel circuit, a pixel drive method.

BACKGROUND

The statements provided herein are merely background information related to the present application, and do not necessarily constitute any prior arts. Active-matrix organic light-emitting diode (AMOLED) displays have been widely used due to their advantages such as thinness, power saving, bright in color and high picture quality. In AMOLED displays, the display panel is usually constituted by multiple lines of pixel cells and a corresponding pixel drive circuit. Generally, the pixel driving circuit is a circuit constituted of a plurality of thin film transistors (TFTs) and capacitances (C). To ensure the uniformity of the display panel, each pixel cell is provided with a drive circuit, as a result, the complexity of the drive circuit and the large number of TFTs result in a low pixels-per-inch (PPI) of the display panel, which in turn results in a low picture quality of the final display.

SUMMARY

To solve the above problems, the present application provides a pixel circuit and a pixel drive method, which are capable of increasing the pixel density of the display panel.

In accordance with a first aspect of embodiments of the present application, a pixel circuit is provided, each line of the pixel circuit includes multiple sets of pixel sub-circuits arranged in a display area and a first reset sub-circuit arranged in a non-display area, each set of pixel sub-circuits includes at least two sub-pixel drive sub-circuits. The sub-pixel drive sub-circuit includes an input component, a compensation component, a drive component, a first light-emitting control component and a first light-emitting element. A first input of the input component is configured to receive a data voltage signal, a second input of the input component is configured to receive a first scan signal, an output of the input component is in connection with a first input of the compensation component, a second input of the compensation component is configured to receive a second scan signal, and an output of the compensation component is in connection with a first input of the drive component, a second input of the drive component is in connection with the output of the input component, a first input of the first light-emitting control component is configured to receive a power supply signal, a second input of the first light-emitting control component is configured to receive a first control signal, and the output of the drive component is in connection with a first input of the first light-emitting element. The output of the drive component in each of the at least two sub-pixel drive sub-circuits is coupled to the output of the first reset sub-circuit, a first input of the first reset sub-circuit is configured to receive an initial voltage signal and a second input of the first reset sub-circuit is configured to receive a third scan signal. The compensation component is configured to compensate a threshold voltage of the drive component, the first light-emitting control component is configured to drive the first light-emitting element to emit light during a light-emitting phase, and the first reset sub-circuit is configured to reset a voltage received in the first light-emitting element to an initial voltage during a reset phase.

In an optional embodiment, the input component includes a first thin film transistor, a gate of the first thin film transistor is the second input of the input component, a first electrode of the first thin film transistor is the first input of the input component and a second electrode of the first thin film transistor is the output of the input component.

In an optional embodiment, the compensation component includes a second thin film transistor, a first capacitor and a second capacitor. A gate of the second thin film transistor is the second input of the compensation component. A first electrode of the second thin film transistor is the first input of the compensation component, and the first electrode of the second thin film transistor is in connection with the second electrode of the first thin film transistor. A second electrode of the second thin film transistor is the output of the compensation component. One end of the first capacitor is in connection with the second electrode of the first thin film transistor, the other end of the first capacitor and one end of the second capacitor are connected in common to the output of the drive component, the other end of the second capacitor is in connection with the second input of the first light-emitting element, and the second input of the first light-emitting element is configured to receive a reference voltage signal.

In an optional embodiment, the drive component includes a third thin film transistor, a gate of the third thin film transistor is the second input of the drive component, a first electrode of the third thin film transistor is the first input of the drive component, the first electrode of the third thin film transistor is in connection with the second electrode of the second thin film transistor, and a second electrode of the third thin film transistor is the output of the drive component.

In an optional embodiment, the first light-emitting control component includes a fourth thin-film transistor, a gate of the fourth thin-film transistor is the second input of the first light-emitting control component, a first electrode of the fourth thin-film transistor is the first input of the first light-emitting control component, a second electrode of the fourth thin-film transistor is the output of the first light-emitting control component, and the second electrode of the fourth thin-film transistor is in connection with the second electrode of the second thin-film transistor and the first electrode of the third thin-film transistor.

In an optional embodiment, the first reset sub-circuit includes a fifth thin film transistor, a gate of the fifth thin film transistor is the second input of the first reset sub-circuit, a first electrode of the fifth thin film transistor is the first input of the first reset sub-circuit, a second electrode of the fifth thin film transistor is the output of the first reset sub-circuit, and the second electrode of the fifth thin film transistor is in connection with the second electrode of the third thin film transistor.

In an optional embodiment, the sub-pixel drive sub-circuit also includes a second light-emitting control component, a first input of the second light-emitting control component is in connection with the output of the drive component, a second input of the second light-emitting control component is configured to receive a first control signal, and an output of the second light-emitting control component is in connection with the first input of the first light-emitting element.

In an optional embodiment, the second light-emitting control component includes a sixth thin film transistor, a gate of the sixth thin film transistor is the second input of the second light-emitting control component, a first electrode of the sixth thin film transistor is the first input of the second light-emitting control component, and a second electrode of the sixth thin film transistor is the output of the second light-emitting control component.

In an optional embodiment, the pixel sub-circuit includes three sub-pixel drive sub-circuits, colors of light emitted from three first light-emitting elements in the three sub-pixel drive sub-circuits are different from each other, and the three first light-emitting elements are one of a red light-emitting element, a green light-emitting element and a blue light-emitting element, respectively.

In an optional embodiment, the pixel sub-circuit includes two sub-pixel drive sub-circuits, one of which also includes a third light-emitting control component and a second light-emitting element. A first input of the third light-emitting control component is in connection with the output of the drive component, a second input of the third light-emitting control component is configured to receive a second control signal and an output of the third light-emitting control component is in connection with an input of the second light-emitting element. The third light-emitting control component is configured to drive the second light-emitting element to emit light during the light-emitting phase, and the first reset sub-circuit is configured to reset voltages received in the first light-emitting element and the second light-emitting element to the initial voltage during the reset phase.

In an optional embodiment, the third light-emitting control component includes a seventh thin-film transistor, a gate of the seventh thin-film transistor is the second input of the third light-emitting control component. A first electrode of the seventh thin-film transistor is the first input of the third light-emitting control component, and the first electrode of the seventh thin-film transistor is in connection with the output of the fifth thin-film transistor. A second electrode of the seventh thin-film transistor is the output of the third light-emitting control, and the second electrode of the seventh thin-film transistor is in connection with the input of the second light-emitting element.

In an optional embodiment, the first light-emitting element and the second light-emitting element provided in one of the two sub-pixel drive sub-circuits are respectively a red light-emitting element and a green light emitting unit, and the first light-emitting element provided in the other one of the two sub-pixel drive sub-circuits is a blue light-emitting element.

In an optional embodiment, the pixel circuit further includes a second reset sub-circuit, and the second reset sub-circuit and the first reset sub-circuit are arranged symmetrically in a non-display area. The second reset sub-circuit and the first reset sub-circuit are arranged on the same alignment. The second reset sub-circuit is configured to reset a voltage received in the first light-emitting element to the initial voltage during the reset phase.

In accordance with a second aspect of embodiments of the present application, a pixel drive method is provided, which is applied to the pixel circuit described in any of the optional ways of the first aspect. The pixel drive method includes the following phases.

In the reset phase, the first scan signal is at a high-level, the data voltage signal is received in the input component, the second scan signal is at a low-level, the compensation component is switched off, the first control signal is at a low-level, the power supply signal is not received in the first light-emitting control component, the third scan signal is at a high-level, the first reset sub-circuit is switched on, the initial voltage signal is received and flowed into the first light-emitting element.

In a threshold-voltage compensation phase, the first scan signal is at a high-level, the data voltage signal is received in the input component, the second scan signal is at a high-level, the compensation component is switched on, the first control signal is at a low-level, the power supply signal is not received in the first light-emitting control component, the third scan signal is at a low-level and the first reset sub-circuit is switched off.

In a data-voltage writing phase, the first scan signal is at a high-level, the data voltage signal is received in the input component, the second scan signal is at a low-level, the compensation component is switched off, the first control signal is at a low-level, the power supply signal is not received in the first light-emitting control component, the third scan signal is at a low-level and the first reset sub-circuit is switched off.

In the light-emitting phase, the first scan signal is at a low-level, the data voltage signal is not received in the input component, the second scan signal is at a high-level, the compensation component is switched on, the third scan signal is at a low-level, the first reset sub-circuit is switched off, the first control signal is at a high-level, the power supply signal is received in the first light-emitting control component and flowed into the first light-emitting element, and the first light-emitting element is driven to emit light.

In an optional embodiment, the second input of the input component, the second input of the compensation component and the second input of the first reset sub-circuit are connected in common to a scan drive sub-circuit, and the scan drive sub-circuit is configured to output the first scan signal, the second scan signal and the third scan signal. The first input of the first light-emitting control component is in connection with a power supply sub-circuit, and the power supply sub-circuit is configured to output the power supply signal. The first input of the input component is in connection with a data drive sub-circuit, and the data drive sub-circuit is configured to output the data voltage signal. The second input of the input component is in connection with a control sub-circuit, and the control sub-circuit is configured to output the first control signal.

In accordance with a third aspect of embodiments of the present application, another pixel drive method is provided, which is applied to the pixel circuit described in any of the optional ways of the first aspect. The pixel drive method includes the following phases.

In the reset phase, the first scan signal is at a high-level, the data voltage signal is received in the input component, the second scan signal is at a low-level, the compensation component is switched off, the first control signal and the second control signal are at a low-level, the power supply signal is not received in the first light-emitting control component, the second light-emitting control component and the third light-emitting control component, the third scan signal is at a high-level, the first reset sub-circuit is switched on, the initial voltage signal is received and flowed into the first light-emitting element and the second light-emitting element.

In a threshold-voltage compensation phase, the first scan signal is at a high-level, the data voltage signal is received in the input component, the second scan signal is at a high-level, the compensation component is switched on, the first control signal and the second control signal are at a low-level, the power supply signal is not received in the first light-emitting control component, the second light-emitting control component and the third light-emitting control component, the third scan signal is at a low-level, the first reset sub-circuit is switched off.

In a data-voltage writing phase, the first scan signal is at a high-level, the data voltage signal is received in the input component, the second scan signal is at a low-level, the compensation component is switched off, the first control signal and the second control signal are at a low-level, the power supply signal is not received in the first light-emitting control component, the second light-emitting control component and the third light-emitting control component, the third scan signal is at a low-level, the first reset sub-circuit is switched off.

In a first light-emitting phase, the first scan signal is at a low-level, the data voltage signal is not received in the input component, the second scan signal is at a high-level, the compensation component is switched on, the third scan signal is at a low-level, the first reset sub-circuit is switched off, the first control signal is at a high-level, the power supply signal is received in the first light-emitting control component and the second light-emitting control component and flowed into the first light-emitting element, the first light-emitting element is driven to emit light, the second control signal is at a low-level and the power supply signal is not received in the third light-emitting control component.

In a second light-emitting phase, the first scan signal is at a low-level, the data voltage signal is not received in the input component, the second scan signal is at a high-level, the compensation component is switched on, the third scan signal is at a low-level, the first reset sub-circuit is switched off, the first control signal of the first light-emitting control component is at a high-level, the first control signal of the second light-emitting control component is at a low-level, and the power supply signal is not received in the second light-emitting control component, the second control signal of the third light-emitting control component is at a high-level, the power supply signal is received in the third light-emitting control component and flowed into the second light-emitting element, and the second light-emitting element is driven to emit light.

In the pixel circuit provided by the present application, each sub-pixel drive sub-circuit in each line of multiple pixel sub-circuits shares the same first reset sub-circuit, so that the display panel only needs to set the first reset sub-circuit corresponding to the number of lines, without setting the corresponding first reset sub-circuit for each sub-pixel drive sub-circuit, and the first reset sub-circuit is set in the non-display area, so that, on the one hand, the number of TFTs in the display area is reduced, thus simplifying the production of the display panel. On the one hand, the number of TFTs in the display area is reduced, thus simplifying the complexity of the display panel and saving costs. On the other hand, the average area occupied by a single sub-pixel drive sub-circuit in the display panel is reduced, allowing more sub-pixel drive sub-circuits to be added to the original size of the display panel, increasing the PPI of the display panel and thus improving the final picture quality of the display panel.

DETAILED DESCRIPTION OF THE EMBODIMENTS

Figure 1:
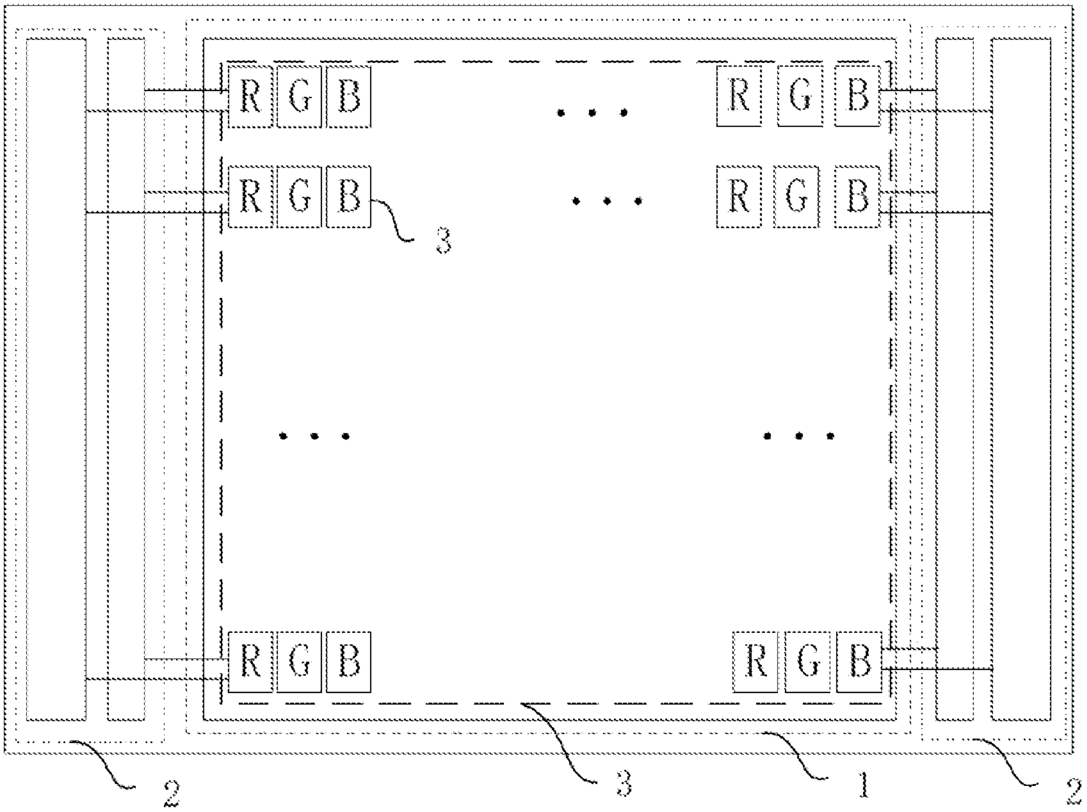
FIG. 1 is a schematic structural diagram of a structure of a display panel.

In order to make the objectives, solutions and beneficial effects of the present application more comprehensible, the present application will be further described in detail below with reference to the drawings and embodiments. It should be understood that specific embodiments described herein are only used to explain the present application, but not to limit the present application.

It should be noted that when an element is referred to as "fixed to" or "arranged on" another element, it may be directly or indirectly on that other element. When an element is referred to "connected" to another element, it may be directly or indirectly connected to that other element.

It should be understood that the orientation or positional relationships indicated by terms such as "length", "width", "up", "down", "front", "back", "left", "right", "vertical", "horizontal", "top", "bottom", "inside", "outside", etc. are based on the orientation or positional relationships shown in the drawings, which are intended only to facilitate and simplify the description of the present application, not to indicate or imply that the device or element referred to must have a particular orientation, be constructed or operated in a particular orientation, and are therefore not to be construed as limiting the present application.

In addition, the terms "first" and "second" are used for descriptive purposes only and are not to be understood as indicating or implying relative importance or as implicitly indicating the number of features indicated. Thus, a feature defined with "first" and "second" may explicitly or implicitly include one or more such features. In the description of the present application, the phrase "a/the plurality of" means two or more, unless otherwise expressly and specifically limited.

The AMOLED may employ gate driver less (GDL) technology to increase throughput and reduce product costs, and AMOLED panels made by GDL technology may have a narrow bezel or bezel-less product form.

The AMOLED display panel includes a display area 1 and a non-display area 2. The display area 1 is provided with multiple sets of pixel sub-circuits, each set of pixel sub-circuit includes at least two sub-pixel drive sub-circuits, as shown in FIG. 1, the pixel sub-circuit may include a red (R) sub-pixel drive sub-circuit, a green (G) sub-pixel drive sub-circuit and a blue (B) sub-pixel drive sub-circuit. Each sub-pixel drive sub-circuit includes: an organic light-emitting diode (OLED), a light-emitting sub-circuit configured for controlling the OLED to emit light, and a reset sub-circuit.

Since the AMOLED display panel include plenty of sub-pixel drive sub-circuits arranged in arrays, and each sub-pixel drive sub-circuit is usually constituted by a plurality of TFTs and a capacitor C, in this way, the large number of TFTs lead to a low PPI of the display panel, which in turn results in a low picture quality of the final display.

For this reason, a pixel circuit and a pixel drive method are provided, in the present application, a same first reset sub-circuit is shared for each sub-pixel drive sub-circuit in each line of the multiple sets of pixel sub-circuits, thus instead of arranging a corresponding first reset sub-circuit for each sub-pixel drive sub-circuit, the number of the first reset sub-circuits required in the display panel is set corresponding to the number of rows. The first reset sub-circuit is arranged in the non-display area, thereby the number of TFTs in the display area can be reduced, thus simplifying the complexity of the display panel and saving costs. The PPI of the display panel is increased, which in turn improves the final display quality of the display panel.

The pixel circuit and the pixel drive method provided in the present application are exemplarily described below in conjunction with the drawings.

Figure 2:
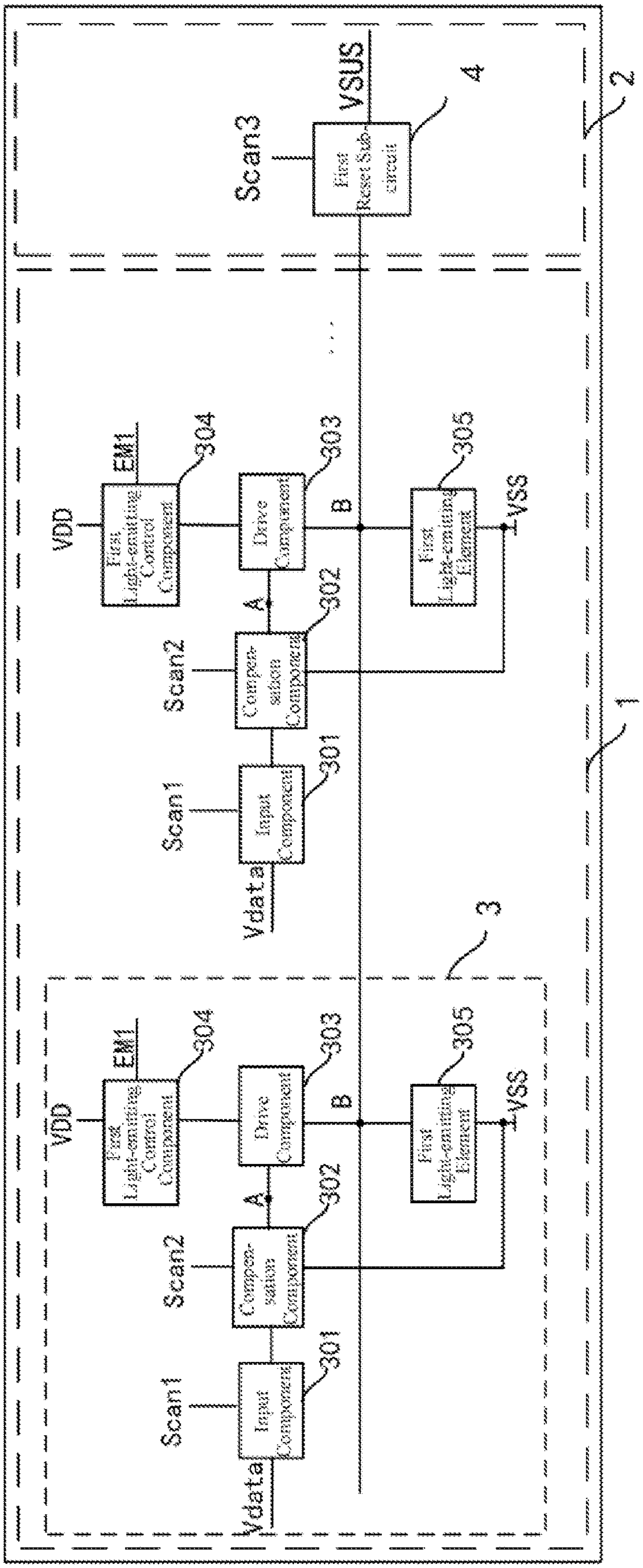
FIG. 2 is a first schematic diagram of the structure of the pixel circuit in accordance with an embodiment of the present application.

FIG. 2 shows a schematic diagram of a pixel circuit in accordance with an embodiment of the present application, as shown in FIG. 2, each line of the pixel circuit includes multiple sets of pixel sub-circuits provided in the display area 1 and a first reset sub-circuit 4 provided in the non-display area 2. Each set of pixel sub-circuits includes at least two sub-pixel drive sub-circuits 3.

In this embodiment, the sub-pixel drive sub-circuit 3 includes an input component 301, a compensation component 302, a drive component 303, a first light-emitting control component 304 and a first light-emitting element 305. A first input of the input component 301 is configured to receive a data voltage signal (Vdata). A second input of the input component 301 is configured to receive a first scan signal Scan1. An output of the input component 301 is connected to a first input of the compensation component 302. A second input of the compensation component 302 is configured to receive a second scan signal Scan2. An output of the compensation component 302 is connected to a first input of the drive component 303. A second input of the drive component 303 is connected to an output of the input component 301. A first input of the first light-emitting control component 304 is configured to receive a power supply signal (Voltage device, VDD). A second input of the first light-emitting control component 304 is configured to receive a first control signal EM1. An output of the drive component 303 is connected to an input of the first light-emitting element 305. An output of the drive component 303 in each of the plurality of sub-pixel drive sub-circuits 3 are coupled (as shown in FIG. 2, point B is the coupling point of the plurality of sub-pixel drive sub-circuits 3) to an output of the first reset sub-circuit 4. A first input of the first reset sub-circuit 4 is configured to receive an initial voltage signal Vsus. A second input of the first reset sub-circuit 4 is configured to receive a third scan signal Scan3.

The compensation component 302 is configured to compensate a threshold voltage of the drive component 301, the first light-emitting control component 304 is configured to drive the first light-emitting element 305 to emit light during a light-emitting phase, and the first reset sub-circuit 4 is configured to reset a voltage received in the first light-emitting element 305 to the initial voltage Vsus during a reset phase. It should be noted that the reset here refers to the reset of the data voltage Vdata and the voltage of the first light-emitting element 305 to the initial voltage VSUS, to enable the pixel circuit to proceed to the next step.

In an exemplary embodiment, the first light-emitting element 305 may be an organic light-emitting diode (OLED), a light-emitting diode (LED), or a quantum dot light-emitting diode (QLED), for which the present application is not specifically limited.

In the pixel circuit provided by the present application, each sub-pixel drive sub-circuit 3 in each line of multiple sets of pixel sub-circuits shares the same first reset sub-circuit 4, so that it is only required for the display panel to set a number of the first reset sub-circuit 4 corresponding to the number of rows, instead of arranging a corresponding first reset sub-circuit 4 for each sub-pixel drive sub-circuit. The first reset sub-circuit 4 is arranged in the non-display area 2, so that, on the one hand, the number of TFTs in the display area is reduced, thus simplifying the complexity of the display panel and saving costs, on the other hand, an average area occupied by a single sub-pixel drive sub-circuit in the display panel is reduced in the pixel circuit, thereby allowing more sub-pixel drive sub-circuits to be added with respect to an original dimension of the display panel, increasing the PPI of the display panel and thus improving the final picture quality of a display to which the display panel is applied.

Figure 3:
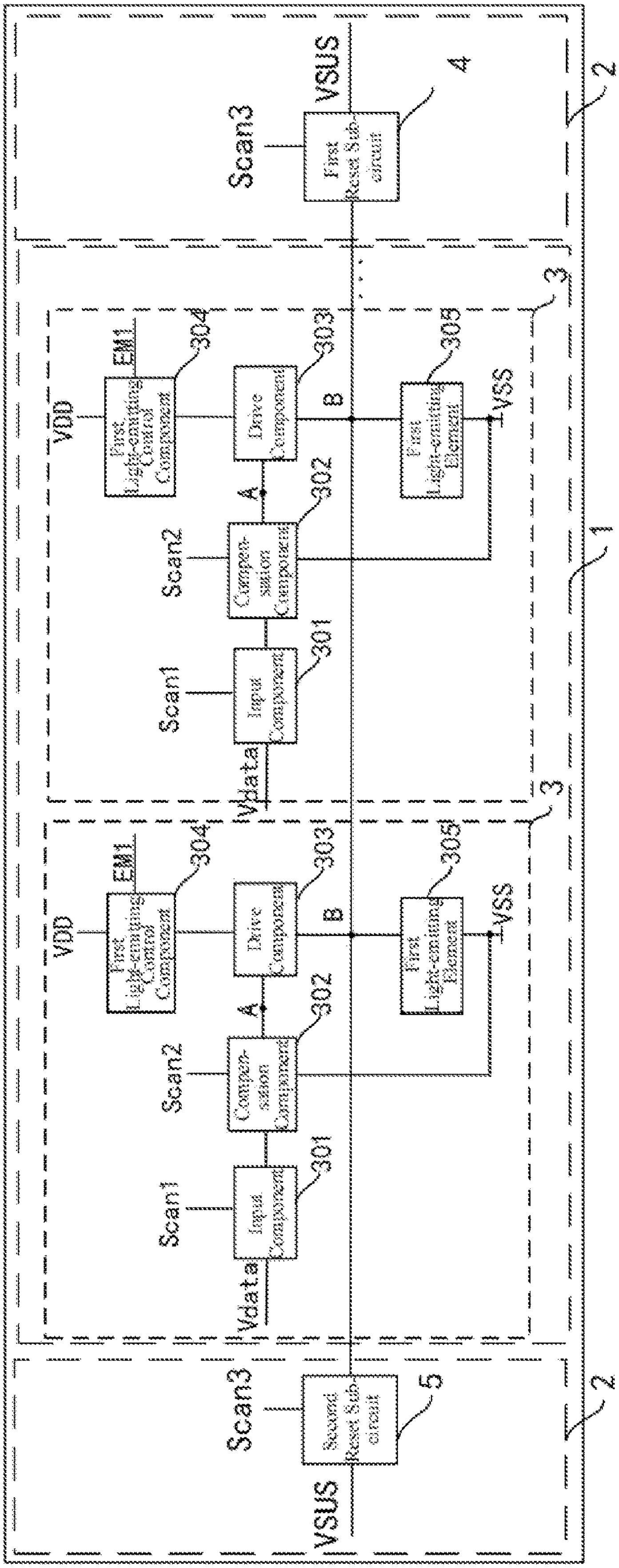
FIG. 3 is a second schematic diagram of the structure of the pixel circuit in accordance with an embodiment of the present application.

It will be appreciated that although the reset phase of the sub-pixel drive sub-circuits 3 in each line is performed simultaneously, a reset effect of the sub-pixel drive sub-circuit 3 located further away from the first reset sub-circuit 4 may be less effective than the reset effect of the sub-pixel drive sub-circuit 3 located closer to the first reset sub-circuit 4. To equalize the reset effect of each sub-pixel drive sub-circuit 3 in each row, in an exemplary embodiment, as shown in FIG. 3, the pixel circuit may also include a second reset sub-circuit 5, the second reset sub-circuit 5 and the first reset sub-circuit 4 are arranged symmetrically in the non-display area 2, the second reset sub-circuit 5 and the first reset sub-circuit 4 are arranged on the same alignment. The second reset sub-circuit 5 is configured to reset the first light-emitting element 305 to the initial voltage VSUS during the reset phase. In an example, if the first reset sub-circuit 4 is arranged in the non-display area 2 on the right side in the display panel, then the second reset sub-circuit 5 is arranged in the non-display area 2 on the left side, that is, a symmetrical arrangement. During the reset phase, the first reset sub-circuit 4 and the second reset sub-circuit 5 located on both sides are configured to reset simultaneously from both sides towards the middle area, thereby equalizing the reset effect of each sub-pixel drive sub-circuit 3 in each row.

It should be noted that each sub-pixel drive sub-circuit 3 needs to be reset in order to enable the sub-pixel drive sub-circuit 3 to emit light normally in the next light-emitting phase, and since the light-emitting of each sub-pixel drive sub-circuit 3 in each line is carried out simultaneously, the reset of each sub-pixel in each line also needs to be carried out simultaneously, so that the light-emitting and reset of the sub-pixel drive sub-circuit 3 in a line may be controlled through a scan line, as a result, the light-emitting and reset of each line corresponds to one scan line, thereby enabling the light-emitting and reset of each line to be carried out simultaneously, ensuring the uniformity of the light-emitting and reset of the display panel. It will be appreciated that scan signals output to each sub-pixel drive sub-circuit through the scan lines output different.

Figure 4:
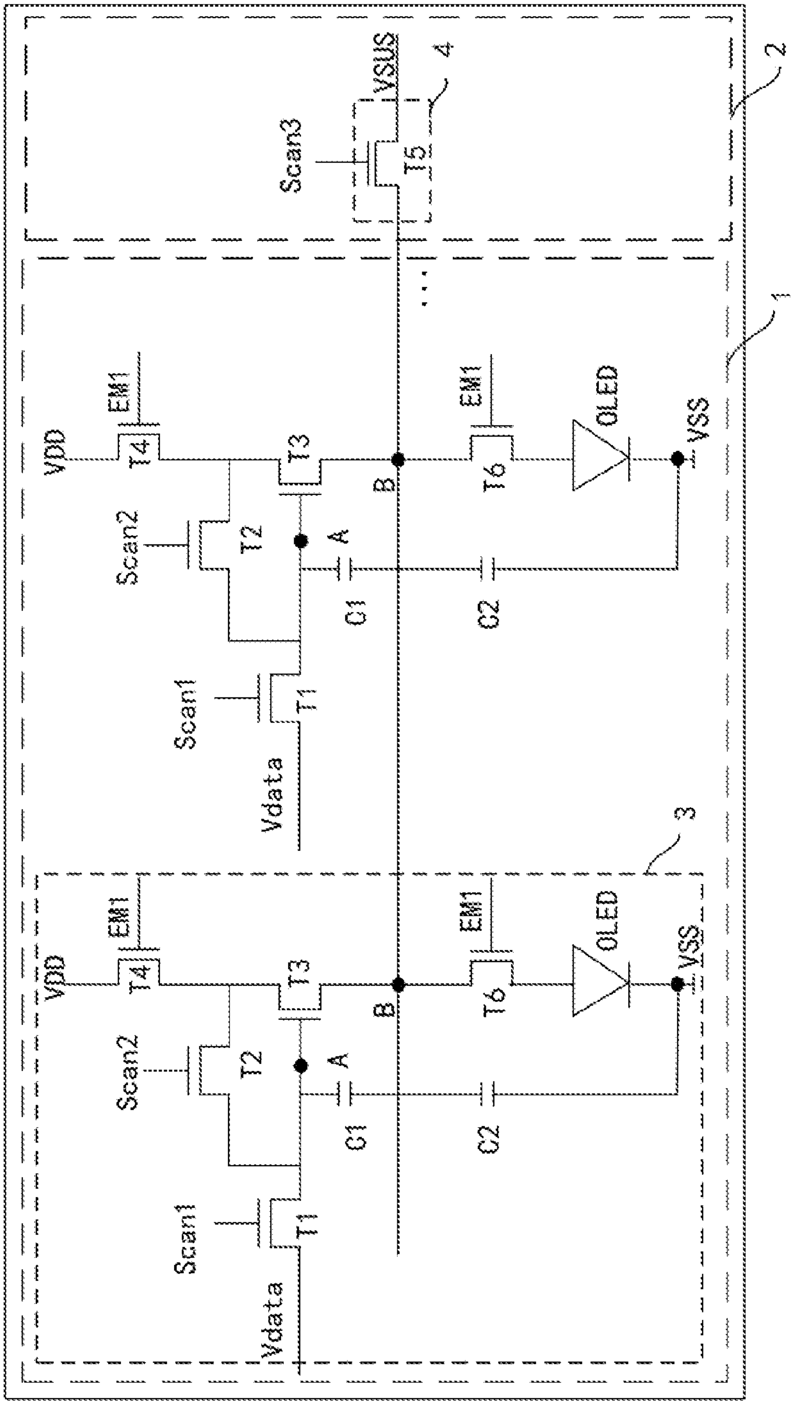
FIG. 4 is a third schematic diagram of the structure of the pixel circuit in accordance with an embodiment of the present application.

In an exemplary embodiment, the input component 301 includes a first thin film transistor (T1 as shown in FIG. 4). A gate of the first thin film transistor T1 is the second input of the input component 301, and is configured to receive the first scan signal Scan1. A first electrode of the first thin film transistor T1 is the first input of the input component 301, and is configured to receive the data voltage signal Vdata. A second electrode of the first thin film transistor T1 is the output of the input component 301.

The compensation component 302 includes a second thin film transistor (T2 as shown in FIG. 4), a first capacitor C1 and a second capacitor C2. A gate of the second thin film transistor T2 is the second input of the compensation component 302, a first electrode of the second thin film transistor T2 is the first input of the compensation component 302, and the first electrode of the second thin film transistor T2 is connected to a second electrode of the first thin film transistor T1.

The second electrode of the second thin film transistor T2 is the output of the compensation component 302. One end of the first capacitor C1 is connected to the second electrode of the first thin film transistor T1, and the other end of the first capacitor C1 and one end of the second capacitor C2 are connected to the output of the drive component 303. The other end of the second capacitor C2 is connected to the second input of the first light-emitting element 305, the second input of the first light-emitting element 305 is configured to receive a reference voltage signal.

The drive component 303 includes a third thin film transistor (T3 as shown in FIG. 4). A gate of the third thin film transistor T3 is the second input of the drive component 303. A first electrode of the third thin film transistor T3 is the first input of the drive component 303, and the first electrode of the third thin film transistor T3 is connected to the second electrode of the second thin film transistor T2. A second electrode of the third thin film transistor T3 is the output of the drive component 303.

The first light-emitting control component 304 includes a fourth thin film transistor (T4 as shown in FIG. 4). A gate of the fourth thin film transistor T4 is the second input of the first light-emitting control component 304. A first electrode of the fourth thin film transistor T4 is the first input of the first light-emitting control component 304. A second electrode of the fourth thin film transistor T4 is the output of the first light-emitting control component 304. The second electrode of the fourth thin film transistor T4 is connected to the second electrode of the second thin film transistor T2 and the first electrode of the third thin film transistor T3, respectively.

The first reset sub-circuit 4 includes a fifth thin film transistor (T5 as shown in FIG. 4). A gate of the fifth thin film transistor T5 is the second input of the first reset sub-circuit 4, and is configured to receive the third scan signal Scan3. A first electrode of the fifth thin film transistor T5 is the first input of the first reset sub-circuit 4, and is configured to receive the initial voltage signal VSUS. A second electrode of the fifth thin film transistor T5 is the first output of the reset sub-circuit 4, and the second electrode of the fifth thin film transistor T5 is connected to the second electrode of the third thin film transistor T3.

In one embodiment, the channel material of the TFT provided in the present application may be Indium Gallium Zinc Oxide (IZGO). Compared to conventional a-Si (amorphous silicon) TFTs, IGZO has three main advantages in terms of performance, i.e., high precision, low power consumption and high touch performance, and due to its low leakage current, electricity can be saved during use. It should be noted that other channel materials may also be used for the TFTs of the present application, which will not be limited herein.

In an exemplary embodiment, the sub-pixel drive sub-circuit 3 may also include a second light-emitting control component. A first input of the second light-emitting control component is connected to the output of the drive component 303. A second input of the second light-emitting control component is configured to receive the first control signal EM1, and an output of the second light-emitting control component is connected to the input of the first light-emitting element 305. The second light-emitting control component is configured to drive the first light-emitting element 305 to emit light during the light-emitting phase.

Exemplarily, the second light-emitting control component may include a sixth thin-film transistor (T6 as shown in FIG. 4). A gate of the sixth thin-film transistor T6 is the second input of the second light-emitting control component. A first electrode of the sixth thin-film transistor T6 is the first input of the second light-emitting control component. A second electrode of the sixth thin-film transistor T6 is the output of the second light-emitting control component.

Figure 5:
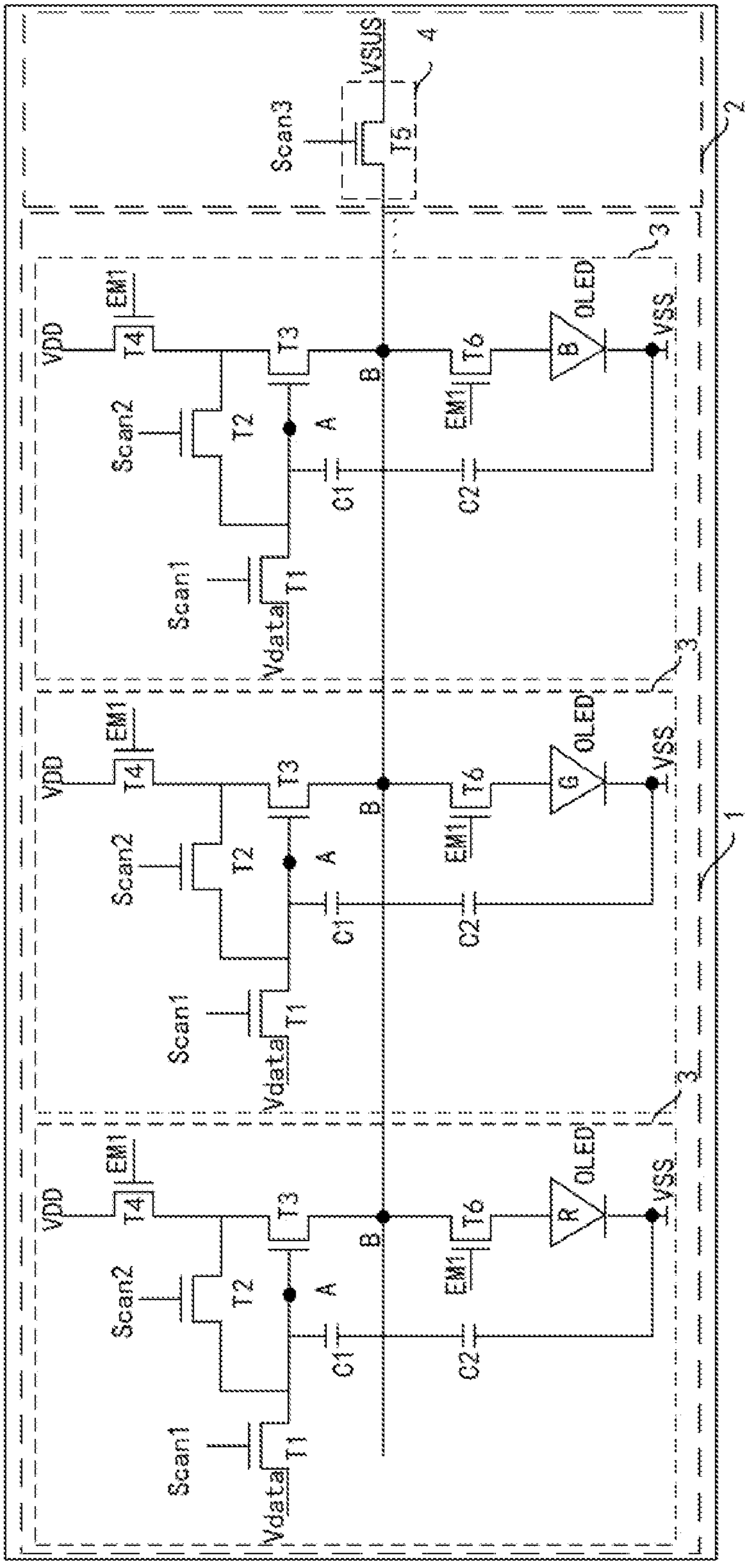
FIG. 5 is a fourth schematic diagram of the structure of the pixel circuit in accordance with an embodiment of the present application.

In an exemplary embodiment, as shown in FIG. 5, the pixel sub-circuit may include three sub-pixel drive sub-circuits 3, colors of light emitted from three first light-emitting elements 305 in the three sub-pixel drive sub-circuits 3 are different from each other, and the three first light-emitting elements are one of a red R light-emitting element, a green G light-emitting element and a blue B light-emitting element.

Under this exemplary embodiment, the present application also provides a pixel drive method which includes the following phases.

Figure 6:
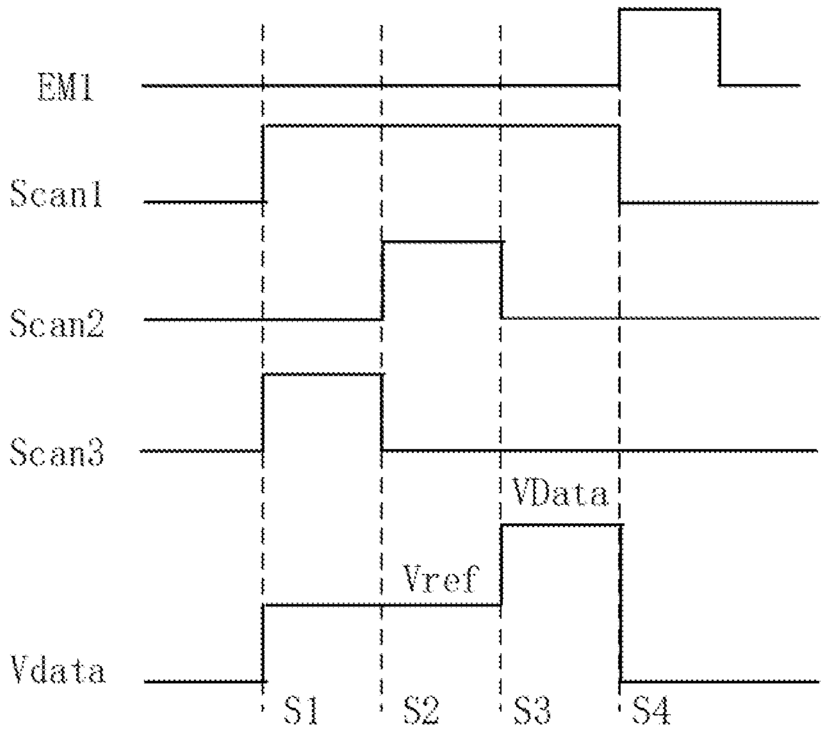
FIG. 6 is a first timing diagram of the pixel circuit in accordance with an embodiment of the present application.

In the reset phase (S1 as shown in FIG. 6), the first scan signal Scanl is at a high-level, the data voltage signal Vdata is received in the input component 301, the second scan signal Scan2 is at a low-level, the compensation component 302 is switched off, the first control signal EM1 is at a low-level, and the power supply signal VDD is not received in the first light-emitting control component 304, ensuring that the first light-emitting element 305 does not emit light at this phase. The third scan signal Scan3 is at a high-level, the first reset sub-circuit 4 is switched on, and the initial voltage signal VSUS is received and flowed into the first light-emitting element 305.

At this time, the first light-emitting element 305 (red R light-emitting element, green G light-emitting element or blue B light-emitting element) does not emit light, the specific voltages at points A and B under the reset phase are as follows: VA=Vdata, where the Vdata is set as the reference voltage (Vref); and VB=Vsus.

It should be noted that the voltage received at point A is the data voltage Vdata received in the input component 301, i.e., the voltage used to control input component 301 to be switched on and off; and the voltage at point B is the voltage received in the first light-emitting element 305 when the first light-emitting control component 304 is switched on.

In a threshold-voltage compensation phase (S2 as shown in FIG. 6), the first scan signal Scan1 is at a high-level, the data voltage signal Vdata is received in the input component, the second scan signal Scan2 is at a high-level, the compensation component 302 is switched on, the first control signal EM1 is at a low-level, the power supply signal VDD is not received in the first light-emitting control component 304, the third scan signal Scan3 is at a low-level, and the first reset sub-circuit 4 is switched off.

At this time, the first light-emitting element 305 (red R light-emitting element, green G light-emitting element or blue B light-emitting element) does not emit light, the specific voltages at points A and B under the threshold-voltage compensation phase are as follows:

$$VA = \text{Vref};$$

$$VB = \text{Vref} - Vth\_T4/T9; \text{ and}$$

VC=VA−VB=Vth T4/T9, where VC refers to a voltage difference between the first capacitor C1 and the second capacitor C2 under the threshold-voltage compensation phase.

It should be noted that the compensation of the threshold voltage (Threshold Voltage, Vth) to the drive component 303 is to avoid the problem that the TFT in the drive component 303 will have a threshold-voltage drift under long-term gate bias, which makes the drive component 303 cannot be switched on and off normally, resulting in residual images on the display, and thus affecting the display effect of the display, therefore, it is necessary to compensate the threshold voltage Vth of the drive component 303 to enable the drive component 303 to be switched on and off normally.

In a data-voltage writing phase (S3 as shown in FIG. 6), the first scan signal Scan1 is at a high-level, the data voltage signal Vdata is received in the input component 301, the second scan signal Scan2 is at a low-level, the compensation component 302 is switched off, the first control signal EM1 is at a low-level, the power supply signal VDD is not received in the first light-emitting control component 304, the third scan signal Scan3 is at a low-level, and the first reset sub-circuit 4 is switched off.

At this time, the voltage Vdata is set as VData, due to an effect of capacitive coupling, a voltage variation at point A will affect a voltage variation at point B. At this time, the voltage variation at point A is that: ΔVA1=Vdata−Vref, then the voltage variation at point B is ΔVB1=ΔV*C1 (C1+C2), at this time, the first light-emitting element 305 (red R light-emitting element, green G light-emitting element or blue B light-emitting element) does not emit light, the specific voltages at point A and B under the data-voltage writing phase are as follows:

$$VB = \text{Vref} - Vth\_T4/T9 + (\text{Vdata} - \text{Vref}) * C1/(C1+C2) = \text{VData} * C1/(C1+C2) + \text{Vref} * C2/(C1+C2) - Vth\_T4/T9;$$

$$VA = \text{VData}; \text{ and}$$

$$VC1 = VA - VB = \text{VData} - [\text{Vref} - Vth + (\text{VData} - \text{Vref}) * C1/(C1+C2)] = (\text{VData} - \text{Vref}) * C2/(C1+C2),$$

where VC1 refers to a voltage difference between the first capacitor C1 and the second capacitor C2 under the data-voltage writing phase.

In the light-emitting phase (S4 as shown in FIG. 6), the first scan signal Scan1 is at a low-level, the data voltage signal Vdata is not received in the input component 301, the second scan signal Scan2 is at a high-level, the compensation component 302 is switched on, the third scan signal Scan3 is at a low-level, the first reset sub-circuit 4 is switched off, the first control signal EM1 is at a high-level, the power supply signal VDD is received in the first light-emitting control component 304 and flowed into the first light-emitting element 305, at this time, the voltage at point B is that: VB=VOLED+VSS (Voltage series, reference voltage), due to the effect of capacitive coupling, the voltage variation at point A is equal to the voltage variation at point B. The voltage variation at point A is as follows:

$$\Delta VA1 = \text{VOLED} + VSS - [\text{Vref} - Vth + (\text{VData} - \text{Vref}) * C1/(C1+C2)].$$

At this point, the first light-emitting element 305 (red R light-emitting element, green G light-emitting element or blue B light-emitting element) is driven to emit light, and the specific voltages at points A and B under the light-emitting phase are as follows:

$$VA = \text{VData} + \text{VOLED} + VSS - [\text{Vref} - Vth + (\text{VData} - \text{Vref}) * C1/(C1+C2)];$$

and $$VB = \text{VOLED} + VSS.$$

VDD is input, at which point a current of the sub-pixel is that: IOLED=½μnCoxW/L (VGS−Vth)*2.

By substituting VA and VB under light-emitting phase into the above equation of the current of the sub-pixel current, the following equation is given:

$$\text{IOLED} = \tfrac{1}{2}\mu n\text{CoxW}/L)[(\text{VData} - \text{Vref}) * C2/(C1+C2)] * 2.$$

Thus, it is concluded that the current in the sub-pixel drive sub-circuit is only related to VData and Vref, and is independent of other parameters, such as threshold voltage Vth. Since the current of the sub-pixel drive sub-circuit is unrelated to the threshold voltage Vth, the problem of the threshold voltage Vth difference in the display panel due to the manufacturing factors, which leads to the inconsistent light-emitting current of the sub-pixel drive sub-circuit, will not be existed. In addition, the threshold voltage Vth drift is also eliminated in this case as the drive component 303 has already compensated for the threshold voltage Vth.

Optionally, the second input of the input component 301, the second input of the compensation component 302 and the second input of the first reset sub-circuit 4 are connected to a scan drive sub-circuit, respectively. The scan drive sub-circuit is configured to output the first scan signal Scan1, the second scan signal Scan2 and the third scan signal Scan3.

In applications, the scan drive sub-circuit can be any device or circuit that has the function of charging the pixels of the display panel in a progressive scan, such as, a gate driver IC or a gate chip-on-film (G-COF), etc.

Optionally, the first input of the first light-emitting control component 304 is connected to a power supply sub-circuit, and the power supply sub-circuit is configured to output the power supply signal VDD.

Optionally, the first input of the input component 301 is connected to a data drive sub-circuit, and the data drive sub-circuit is configured to output the data voltage signal Vdata.

In applications, the data drive sub-circuit may be a source driver IC.

Optionally, the second input of the input component 301 is connected to a control sub-circuit, and the control sub-circuit is configured to output the first control signal EM1.

In applications, the control sub-circuit may be a timing controller (TCON), or a central processing unit (CPU), a general-purpose processor, a digital signal processor (DSP), an application specific integrated circuit (ASIC), a field-programmable gate array (FPGA) or other programmable logic devices, discrete gate or transistor logic devices, discrete hardware components, etc.

In one embodiment, the scan drive sub-circuit, the data drive sub-circuit, the power supply sub-circuit and the control sub-circuit may be arranged in the non-display area 2.

In another exemplary embodiment, the pixel sub-circuit includes two sub-pixel drive sub-circuits 3, one of the two sub-pixel drive sub-circuits 3 also includes a third light-emitting control component and a second light-emitting element. A first input of the third light-emitting control component is connected to the output of the drive component 303, a second input of the third light-emitting control component is configured to receive the second control signal EM2 and the output of the third light-emitting control component is connected to an input of the second light-emitting element. The third light-emitting control component is configured to drive the second light-emitting element to emit light during the light-emitting phase. The first reset sub-circuit 4 is configured to reset the first light-emitting element 305 and the second light-emitting element to the initial voltage VSUS during the reset phase.

It can be understood that the light-emitting effect of the blue sub-pixel may be affected as the blue B light-emitting element is less stable during a sharing. Thus, in this embodiment, one of the two sub-pixel drive sub-circuits 3 has a first light-emitting element 305 that is a red R light-emitting element and a second light-emitting element that is a green G light-emitting element, while the other one of the two sub-pixel drive sub-circuits 3 has a first light-emitting element that is a blue B light-emitting element. In this way, the red R light-emitting element and the green G light-emitting element share the same first reset sub-circuit 4, which not only ensures that the red R light-emitting element and the green G light-emitting element can emit light normally and guarantee the display effect of the display, but also greatly reduces the number of TFTs and improves the PPI of the display panel, so that the display can achieve a more delicate display effect.

Figure 7:
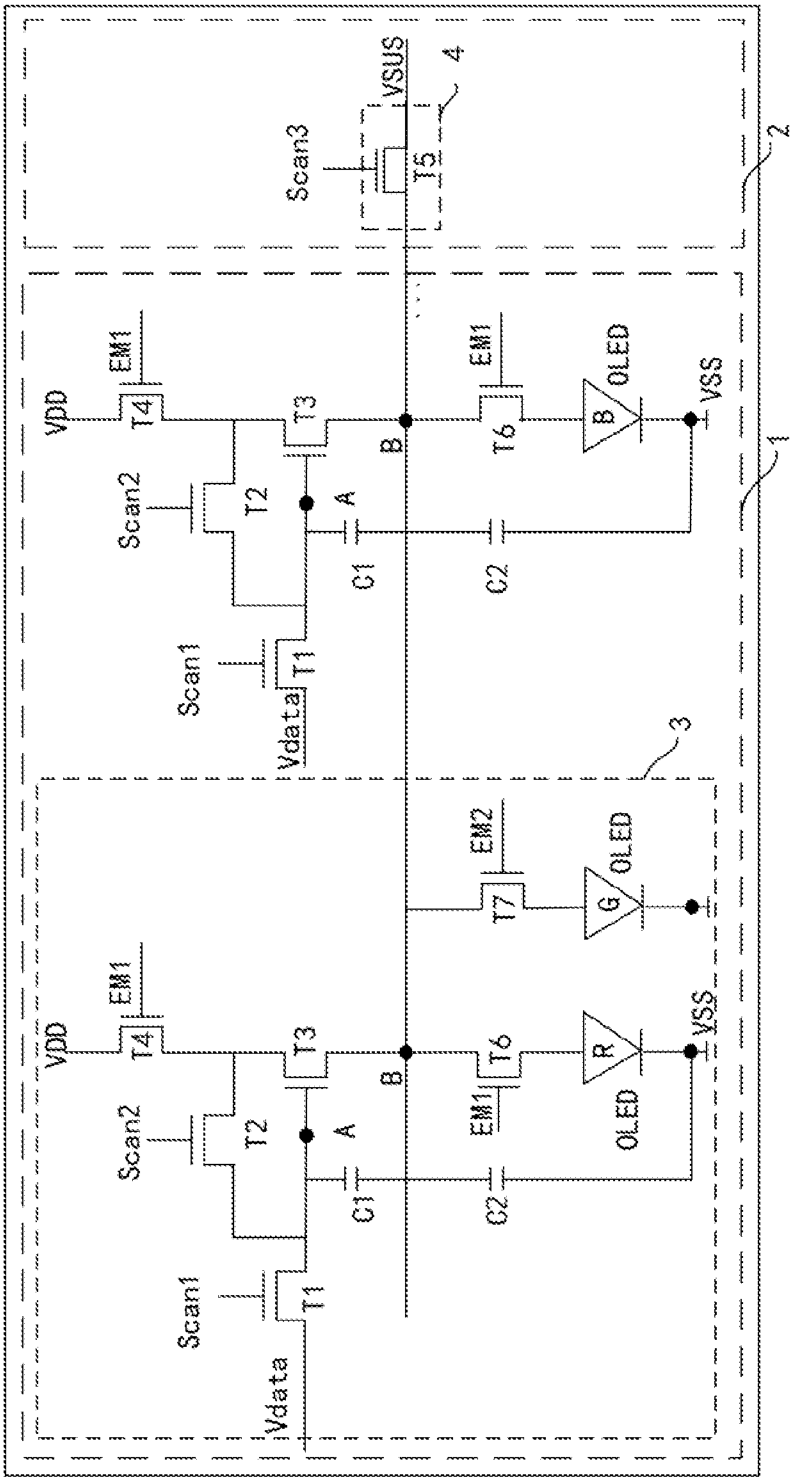
FIG. 7 is a fifth schematic diagram of the structure of the pixel circuit in accordance with an embodiment of the present application.

Exemplarily, as shown in FIG. 7, the third light-emitting control component includes a seventh thin film transistor (T7 as shown in FIG. 7). A gate of the seventh thin film transistor T7 is the second input of the third light-emitting control component. A first electrode of the seventh thin film transistor T7 is the first input of the third light-emitting control component, and the first electrode of the seventh thin film transistor T7 is connected to the output of the fifth thin film transistor T5. A second electrode of the thin film transistor T7 is the output of the third light-emitting control component, and the second electrode of the seventh thin film transistor T7 is connected to the input of the second light-emitting element.

Under this exemplary embodiment, the present application further provides a pixel drive method, which includes the following phases.

Figure 8:
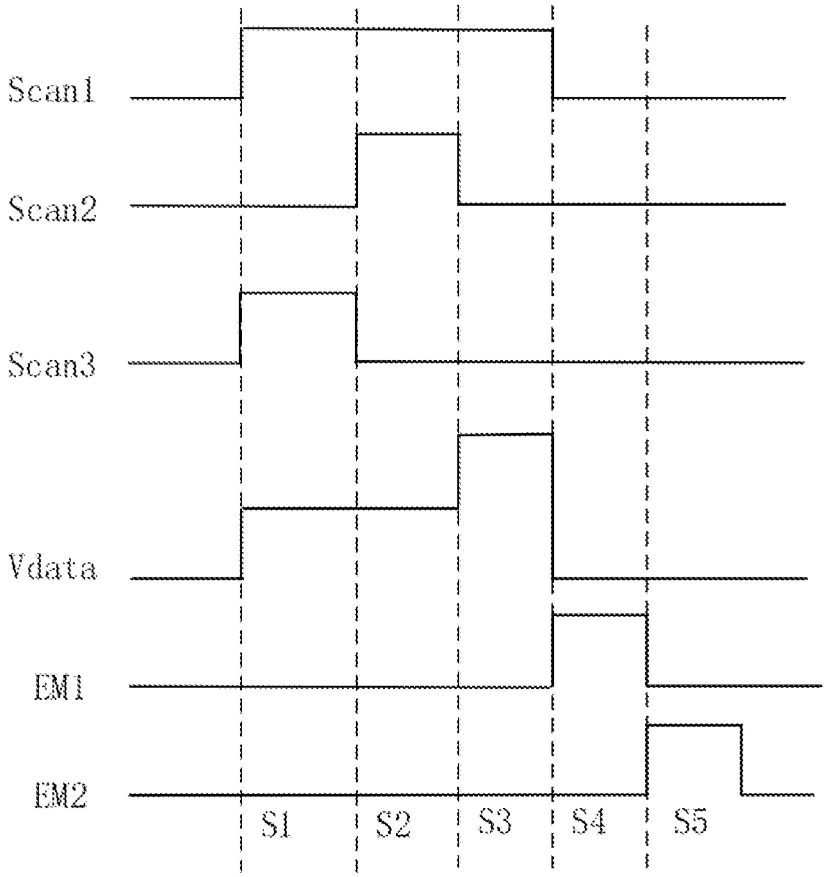
FIG. 8 is a second timing diagram of the pixel circuit in accordance with an embodiment of the present application.

In the reset phase (S1 as shown in FIG. 8), the first scan signal Scan1 is at a high-level, the data voltage signal Vdata is received in the input component 301, the second scan signal Scan2 is at a low-level, the compensation component 302 is switched off, the first control signal EM1 and the second control signal EM2 are at a low-level, the power supply signal VDD is not received in the first light-emitting control component (T4), the second light-emitting control component (T6) and the third light-emitting control component (T7), the third scan signal Scan3 is at a high-level, the first reset sub-circuit 4 switched on, the initial voltage signal VSUS is received and flowed into the first light-emitting element 305 (red R light-emitting element and blue B light-emitting element) and the second light-emitting element (green G light-emitting element).

At this time, the first light-emitting element 305 and the second light-emitting element do not emit light, the specific voltages at points A and B under the reset phase are as follows:

VA=Vdata, where the Vdata is set as the reference voltage (Vref); and

VB=Vsus.

In the threshold-voltage compensation phase (S2 as shown in FIG. 8), the first scan signal Scan1 is at a high-level, the data voltage signal Vdata is received in the input component 301, the second scan signal Scan2 is at a high-level, the compensation component 302 is switched on, the first control signal EM1 and the second control signal EM2 are at a low-level, the power supply signal VDD is not received in the first light-emitting control component (T4), the second light-emitting control component (T6) and the third light-emitting control component (T7), the third scan signal Scan3 is at a low-level, and the first reset sub-circuit 4 is switched off.

At this time, the first light-emitting element 305 and the second light-emitting element do not emit light, the specific voltages at points A and B under the threshold-voltage compensation phase are as follows:

$$VA=\mathrm{Vref};$$

$$VB=\mathrm{Vref}-Vth\_T4;\ \text{and}$$

$$VC=VA-VB=Vth\_T4.$$

In the data-voltage writing phase (S3 as shown in FIG. 8), the first scan signal Scan1 is at a high-level, the data voltage signal Vdata is received in the input component 301, the second scan signal Scan2 is at a low-level, the compensation component 302 is switched off, the first control signal EM1 and the second control signal EM2 are at a low-level, the power supply signal VDD is not received in the first light-emitting control component (T4), the second light-emitting control component (T6) and the third light-emitting control component (T7), the third scan signal Scan3 is at a low-level, and the first reset sub-circuit 4 is switched off.

At this time, the first light-emitting element 305 and the second light-emitting element do not emit light, the specific voltages at points A and B under the data-voltage writing phase are as follows:

$$VB=\mathrm{Vref}-Vth\_T4+(\mathrm{Vdata}-\mathrm{Vref})*C1/(C1+C2)=\mathrm{VData}*C1/(C1+C2)+\mathrm{Vref}*C2/(C1+C2)-Vth\_T4;$$

$$VA=\mathrm{VData};\ \text{and}$$

$$VC1=VA-VB=\mathrm{VData}-[\mathrm{Vref}-Vth+(\mathrm{VData}-\mathrm{Vref})*C1/(C1+C2)]=(\mathrm{VData}-\mathrm{Vref})*C2/(C1+C2).$$

In a first light-emitting phase (S4 as shown in FIG. 8), the first scan signal Scan1 is at a low-level, the data voltage signal Vdata is received in the input component 301, the second scan signal Scan2 is at a high-level, the compensation component 302 is switched on, the third scan signal Scan3 is at a low-level, the first reset sub-circuit 4 is switched off, the first control signal EM1 is at a high-level, the power supply signal VDD is received in the first light-emitting control component (T4) and the second light-emitting control component (T6) and flowed into the first light-emitting elements ((i.e., the red R light-emitting element and the blue B light-emitting element), and then the first light-emitting elements are driven to emit light. The second control signal EM2 is at a low-level, the power supply signal VDD is not received in the third light-emitting control component (T7).

At this time, the voltage at point B is that: VB=VOLED_R+VSS, due to the effect of the capacitive coupling, the voltage variation at point A is equal to the voltage variation at point B. The voltage variation at point A is that:

$$\Delta VA2 = \text{VOLED\_}R + VSS - [\text{Vref} - Vth + (\text{VData} - \text{Vref}) * C1/(C1+C2)].$$

At this point, the first light-emitting elements ((i.e., the red R light-emitting element and the blue B light-emitting element) are driven to emit light, the specific voltages at points A and B under the first light-emitting phase are as follows:

$$VA = \text{VData} + \text{VOLED\_}R + VSS - [\text{Vref} - Vth + (\text{VData} - \text{Vref}) * C1/(C1+C2)];$$

and $$VB = \text{VOLED\_}R + VSS.$$

VDD is input, at which point the current of the first light-emitting element 305 is that: IOLED=½ μnCoxW/L (VGS−Vth)*2.

By substituting VA and VB under light-emitting phase into the above equation of the current of the sub-pixel current, the following equation is given:

$$\text{IOLED} = \tfrac{1}{2}(\mu n\text{CoxW}/L)[(\text{VData} - \text{Vref}) * C2/(C1+C2)] * 2.$$

Thus, it is concluded that the current in the sub-pixel drive sub-circuit is only related to VData and Vref, and is independent of other parameters, such as threshold voltage Vth. Thus, in this exemplary embodiment, the problem of the threshold voltage Vth difference in the display panel due to the manufacturing factors, which leads to the inconsistent light-emitting current of the sub-pixel drive sub-circuit, is also not existed.

Substitute VA and VB at this point into the above current equation for the first light-emitting element 305, resulting in $$\text{IOLED} = \tfrac{1}{2}(\mu n\text{CoxW}/L)[(\text{VData} - \text{Vref}) * C2/(C1+C2)] * 2.$$

In this way, it is concluded that the current of the first light-emitting element 305 is only related to VData and Vref, and is not related to other parameters, such as the threshold voltage Vth, etc. Therefore, in this example, there is also no display panel due to the factors made and thus the threshold voltage Vth is not the same, thus leading to inconsistent light-emitting current of the first light-emitting element 305.

In a second light-emitting phase (S5 as shown in FIG. 8), the first scan signal Scan1 is at a low-level, the data voltage signal Vdata is not received in the input component 301, the second scan signal Scan2 is at a high-level, the compensation component 302 is switched on, the third scan signal Scan3 is at a low-level, the first reset sub-circuit 4 is switched off, the first control signal of the first light-emitting control component (T4) EM1 is at a high-level, the first control signal EM1 of the second light-emitting control component (T6) is at a low-level, the power supply signal VDD is not received in the second light-emitting control component (T6), the second control signal EM2 of the third light-emitting control component (T7) is at a high-level, the power supply signal VDD is received in the third light-emitting control component (T7) and flowed into the second light-emitting element (i.e., the green G light-emitting element), and the second light-emitting element ((i.e., the green G light-emitting element) is driven to emit light.

At this time, the voltage variation at point B is that: ΔVB=VOLED_G+VSS−(VOLED_R+VSS)=VOLED_G−VOLED_R, due to the effect of capacitive coupling, the voltage variation at point A is equal to the voltage variation at point B, and then, the second light-emitting element (i.e., the green G light-emitting element) is driven to emit light, the specific voltages at point A and B under the second light-emitting phase is that:

$$VA = \text{VData} + \text{VOLED\_}R + VSS - [\text{Vref} - Vth + (\text{VData} - \text{Vref}) C1/(C1+C2)] + \Delta VB; \text{ and}$$

$$VB = \text{VOLED\_}R + VSS.$$

VDD is input, at which point the current of the second light-emitting element is that: IOLED=½μnCoxW/L (VGS−Vth)*2.

By substituting VA and VB under light-emitting phase into the above equation of the current of the sub-pixel current, the following equation is given:

$$\text{IOLED} = \tfrac{1}{2}(\mu n\text{CoxW}/L)[(\text{VData} - \text{Vref}) * C2/(C1+C2)] * 2.$$

In this way, it is also concluded that the current of the first light-emitting element 305 is only related to VData and Vref.

In the pixel circuit provided by the present application, each sub-pixel drive sub-circuit 3 in each line of multiple sets of pixel sub-circuits shares the same first reset sub-circuit 4, so that it is only required for the display panel to set a number of the first reset sub-circuit 4 corresponding to the number of rows, instead of arranging a corresponding first reset sub-circuit 4 for each sub-pixel drive sub-circuit. The first reset sub-circuit 4 is arranged in the non-display area 2, so that, on the one hand, the number of TFTs in the display area is reduced, thus simplifying the complexity of the display panel and saving costs, on the other hand, the average area occupied by a single sub-pixel drive sub-circuit in the display panel is reduced in the pixel circuit, thereby allowing more sub-pixel drive sub-circuits to be added with respect to an original dimension of the display panel, increasing the PPI of the display panel and thus improving the final picture quality of a display to which the display panel is applied.

In the above embodiments, the description of each embodiment has its own focus, for parts that are not detailed or documented in a particular embodiment, reference may be made to the relevant descriptions of other embodiments.

The above-described embodiments are only intended to illustrate the solutions of the present application and not intended to limit the present application. Although the present application is described in detail with reference to the above embodiments, it should be understood by those of ordinary skill in the art that the solutions described in the above embodiments may be modified or some features of the above embodiment may be equivalently substituted. These modifications or substitutions do not make the essence of the corresponding solutions deviate from the spirit and scope of the solutions in the embodiments of the present application, and thus shall be included within the protection scope of the present application.

What is claimed is:

1. A pixel circuit, each line of the pixel circuit comprising:

multiple sets of pixel sub-circuits, arranged in a display area, each set of the pixel sub-circuits comprising at least two sub-pixel drive sub-circuits, and each of the sub-pixel drive sub-circuits comprising:

an input component, wherein a first input of the input component is configured to receive a data voltage signal, and a second input of the input component is configured to receive a first scan signal;

a compensation component, wherein a first input of the compensation component is in connection with an output of the input component, and a second input of the compensation component is configured to receive a second scan signal;

a drive component, wherein a first input of the drive component is in connection with an output of the compensation component, and a second input of the drive component is in connection with the output of the input component;

a first light-emitting control component, wherein a first input of the first light-emitting control component is configured to receive a power supply signal, and a second input of the first light-emitting control component is configured to receive a first control signal; and a first light-emitting element, wherein a first input of the first light-emitting element is in connection with the output of the drive component; and a first reset sub-circuit, arranged in a non-display area, where a first input of the first reset sub-circuit is configured to receive an initial voltage signal, and a second input of the first reset sub-circuit is configured to receive a third scan signal;

wherein the output of the drive component in each of the at least two sub-pixel drive sub-circuits is coupled to an output of the first reset sub-circuit, the compensation component is configured to compensate a threshold voltage of the drive component, the first light-emitting control component is configured to drive the first light-emitting element to emit light during a light-emitting phase, and the first reset sub-circuit is configured to reset a voltage received in the first light-emitting element to an initial voltage during a reset phase, wherein the sub-pixel drive sub-circuit further comprises a second light-emitting control component, a first input of the second light-emitting control component is in connection to the output of the drive component, a second input of the second light-emitting control component is configured to receive a first control signal, and an output of the second light-emitting control component is in connection with the first input of the first light-emitting element, wherein the pixel sub-circuit comprises two of the sub-pixel drive sub-circuits, one of the two sub-pixel drive sub-circuits further comprises:

a third light-emitting control component, wherein a first input of the third light-emitting control component is in connection with the output of the drive component, and a second input of the third light-emitting control component is configured to receive a second control signal; and a second light-emitting element, an input of the second light-emitting element is in connection with an output of the third light-emitting control component, and wherein the third light-emitting control component is configured to drive the second light-emitting element to emit light during the light-emitting phase, and the first reset sub-circuit is configured to reset voltages received in the first light-emitting element and the second light-emitting element to the initial voltage during the reset phase.

2. The pixel circuit according to claim 1, wherein the input component comprises a first thin film transistor, a gate of the first thin film transistor is the second input of the input component, a first electrode of the first thin film transistor is the first input of the input component and a second electrode of the first thin film transistor is the output of the input component.

3. The pixel circuit according to claim 2, wherein the compensation component comprises a second thin film transistor, a first capacitor and a second capacitor;

a gate of the second thin film transistor is the second input of the compensation component, a first electrode of the second thin film transistor is the first input of the compensation component, and the first electrode of the second thin film transistor is in connection with the second electrode of the first thin film transistor, a second electrode of the second thin film transistor is the output of the compensation component, one end of the first capacitor is in connection with the first thin film transistor, the other end of the first capacitor and one end of the second capacitor are connected in common to the output of the drive component, the other end of the second capacitor is in connection with a second input of the first light-emitting element, and the second input of the first light-emitting element is configured to receive a reference voltage signal.

4. The pixel circuit according to claim 3, wherein the drive component comprises a third thin film transistor, a gate of the third thin film transistor is the second input of the drive component, a first electrode of the third thin film transistor is the first input of the drive component, the first electrode of the third thin film transistor is in connection with the second electrode of the second thin film transistor, and a second electrode of the third thin film transistor is the output of the drive component.

5. The pixel circuit according to claim 4, wherein the first light-emitting control component comprises a fourth thin film transistor, a gate of the fourth thin film transistor is the second input of the first light-emitting control component, a first electrode of the fourth thin film transistor is the first input of the first light-emitting control component, a second electrode of the fourth thin film transistor is the output of the first light-emitting control component, and the second electrode of the fourth thin-film transistor is in connection with the second electrode of the second thin-film transistor and the first electrode of the third thin-film transistor.

6. The pixel circuit according to claim 5, wherein the first reset sub-circuit comprises a fifth thin film transistor, a gate of the fifth thin film transistor is the second input of the first reset sub-circuit, a first electrode of the fifth thin film transistor is the first input of the first reset sub-circuit, a second electrode of the fifth thin film transistor is the output of the first reset sub-circuit, and the second electrode of the fifth thin film transistor is in connection with the second electrode of the third thin film transistor.

7. The pixel circuit according to claim 1, wherein the second light-emitting control component comprises a sixth thin film transistor, a gate of the sixth thin film transistor is the second input of the second light-emitting control component, a first electrode of the sixth thin film transistor is the first input of the second light-emitting control component, and a second electrode of the sixth thin film transistor is the output of the second light-emitting control component.

8. The pixel circuit according to claim 1, wherein the third light-emitting control component comprises a seventh thin film transistor, a gate of the seventh thin film transistor is the second input of the third light-emitting control component, a first electrode of the seventh thin film transistor is the first input of the third light-emitting control component, the first electrode of the seventh thin film transistor is in connection with the output of the fifth thin film transistor, a second electrode of the seventh thin film transistor is the output of the third light-emitting control component, and the second electrode of the seventh thin film transistor is in connection with the input of the second light-emitting element.

9. The pixel circuit according to claim 8, wherein the first light-emitting element and the second light-emitting element provided in one of the two sub-pixel drive sub-circuits are respectively a red light-emitting element and a green light emitting unit, and the first light-emitting element provided in the other one of the two sub-pixel drive sub-circuits is a blue light-emitting element.

10. The pixel circuit according to claim 9, wherein the pixel circuit further comprises a second reset sub-circuit, wherein the second reset sub-circuit and the first reset sub-circuit are arranged symmetrically in the non-display area, the second reset sub-circuit and the first reset sub-circuit are arranged on the same alignment, and the second reset sub-circuit is configured to reset a voltage received in the first light-emitting element to the initial voltage during the reset phase.

11. A pixel drive method, applied to a pixel circuit, each line of the pixel circuit comprising:

multiple sets of pixel sub-circuits, arranged in a display area, each set of the pixel sub-circuits comprising at least two sub-pixel drive sub-circuits, and each of the sub-pixel drive sub-circuits comprising:

an input component, wherein a first input of the input component is configured to receive a data voltage signal, and a second input of the input component is configured to receive a first scan signal;

a compensation component, wherein a first input of the compensation component is in connection with an output of the input component, and a second input of the compensation component is configured to receive a second scan signal;

a drive component, wherein a first input of the drive component is in connection with an output of the compensation component, and a second input of the drive component is in connection with the output of the input component;

a first light-emitting control component, wherein a first input of the first light-emitting control component is configured to receive a power supply signal, and a second input of the first light-emitting control component is configured to receive a first control signal; and a first light-emitting element, wherein a first input of the first light-emitting element is in connection with the output of the drive component; and a first reset sub-circuit, arranged in a non-display area, where a first input of the first reset sub-circuit is configured to receive an initial voltage signal, and a second input of the first reset sub-circuit is configured to receive a third scan signal;

wherein the output of the drive component in each of the at least two sub-pixel drive sub-circuits is coupled to an output of the first reset sub-circuit, the compensation component is configured to compensate a threshold voltage of the drive component, the first light-emitting control component is configured to drive the first light-emitting element to emit light during a light-emitting phase, and the first reset sub-circuit is configured to reset a voltage received in the first light-emitting element to an initial voltage during a reset phase, wherein the sub-pixel drive sub-circuit further comprises a second light-emitting control component, a first input of the second light-emitting control component is in connection to the output of the drive component, a second input of the second light-emitting control component is configured to receive a first control signal, and an output of the second light-emitting control component is in connection with the first input of the first light-emitting element, wherein the pixel sub-circuit comprises two of the sub-pixel drive sub-circuits, one of the two sub-pixel drive sub-circuits further comprises:

a third light-emitting control component, wherein a first input of the third light-emitting control component is in connection with the output of the drive component, and a second input of the third light-emitting control component is configured to receive a second control signal; and a second light-emitting element, an input of the second light-emitting element is in connection with an output of the third light-emitting control component, and wherein the third light-emitting control component is configured to drive the second light-emitting element to emit light during the light-emitting phase, and the first reset sub-circuit is configured to reset voltages received in the first light-emitting element and the second light-emitting element to the initial voltage during the reset phase, and the pixel drive method comprising:

in the reset phase, the first scan signal is at a high-level, the data voltage signal is received in the input component, the second scan signal is at a low-level, the compensation component is switched off, the first control signal is at a low-level, the power supply signal is not received in the first light-emitting control component, the third scan signal is at a high-level, the first reset sub-circuit is switched on, the initial voltage signal is received and transmitted to the first light-emitting element;

in a threshold-voltage compensation phase, the first scan signal is at a high-level, the data voltage signal is received in the input component, the second scan signal is at a high-level, the compensation component is switched on, the first control signal is at a low-level, the power supply signal is not received in the first light-emitting control component, the third scan signal is at a low-level and the first reset sub-circuit is switched off;

in a data-voltage writing phase, the first scan signal is at a high-level, the data voltage signal is received in the input component, the second scan signal is at a low-level, the compensation component is switched off, the first control signal is at a low-level, the power supply signal is not received in the first light-emitting control component, the third scan signal is at a low-level and the first reset sub-circuit is switched off; and in the light-emitting phase, the first scan signal is at a low-level, the data voltage signal is not received in the input component, the second scan signal is at a high-level, the compensation component is switched on, the third scan signal is at a low-level, the first reset sub-circuit is switched off, the first control signal is at a high-level, the power supply signal is received in the first light-emitting control component and transmitted to the first light-emitting element, and the first light-emitting element is driven to emit light.

12. The pixel drive method according to claim 11, wherein the second input of the input component, the second input of the compensation component and the second input of the first reset sub-circuit are connected in common to a scan drive sub-circuit, and the scan drive sub-circuit is configured to output the first scan signal, the second scan signal and the third scan signal;

the first input of the first light-emitting control component is in connection with a power supply sub-circuit, and the power supply sub-circuit is configured to output the power supply signal;

the first input of the input component is in connection with a data drive sub-circuit, and the data drive sub-circuit is configured to output the data voltage signal; and the second input of the input component is in connection with a control sub-circuit, and the control sub-circuit is configured to output the first control signal.

13. A pixel drive method, applied to a pixel circuit, each line of the pixel circuit comprising:

multiple sets of pixel sub-circuits, arranged in a display area, each set of the pixel sub-circuits comprising at least two sub-pixel drive sub-circuits, and each of the sub-pixel drive sub-circuits comprising:

an input component, wherein a first input of the input component is configured to receive a data voltage signal, and a second input of the input component is configured to receive a first scan signal;

a compensation component, wherein a first input of the compensation component is in connection with an output of the input component, and a second input of the compensation component is configured to receive a second scan signal;

a drive component, wherein a first input of the drive component is in connection with an output of the compensation component, and a second input of the drive component is in connection with the output of the input component;

a first light-emitting control component, wherein a first input of the first light-emitting control component is configured to receive a power supply signal, and a second input of the first light-emitting control component is configured to receive a first control signal; and a first light-emitting element, wherein a first input of the first light-emitting element is in connection with the output of the drive component; and a first reset sub-circuit, arranged in a non-display area, where a first input of the first reset sub-circuit is configured to receive an initial voltage signal, and a second input of the first reset sub-circuit is configured to receive a third scan signal;

wherein the output of the drive component in each of the at least two sub-pixel drive sub-circuits is coupled to an output of the first reset sub-circuit, the compensation component is configured to compensate a threshold voltage of the drive component, the first light-emitting control component is configured to drive the first light-emitting element to emit light during a light-emitting phase, and the first reset sub-circuit is configured to reset a voltage received in the first light-emitting element to an initial voltage during a reset phase, wherein the sub-pixel drive sub-circuit further comprises a second light-emitting control component, a first input of the second light-emitting control component is in connection to the output of the drive component, a second input of the second light-emitting control component is configured to receive a first control signal, and an output of the second light-emitting control component is in connection with the first input of the first light-emitting element, wherein the pixel sub-circuit comprises two of the sub-pixel drive sub-circuits, one of the two sub-pixel drive sub-circuits further comprises:

a third light-emitting control component, wherein a first input of the third light-emitting control component is in connection with the output of the drive component, and a second input of the third light-emitting control component is configured to receive a second control signal; and a second light-emitting element, an input of the second light-emitting element is in connection with an output of the third light-emitting control component, and wherein the third light-emitting control component is configured to drive the second light-emitting element to emit light during the light-emitting phase, and the first reset sub-circuit is configured to reset voltages received in the first light-emitting element and the second light-emitting element to the initial voltage during the reset phase, and the pixel drive method comprising:

in the reset phase, the first scan signal is at a high-level, the data voltage signal is received in the input component, the second scan signal is at a low-level, the compensation component is switched off, the first control signal and the second control signal are at a low-level, the power supply signal is not received in the first light-emitting control component, the second light-emitting control component and the third light-emitting control component, the third scan signal is at a high-level, the first reset sub-circuit is switched on, the initial voltage signal is received and transmitted to the first light-emitting element and the second light-emitting element;

in a threshold-voltage compensation phase, the first scan signal is at a high-level, the data voltage signal is received in the input component, the second scan signal is at a high-level, the compensation component is switched on, the first control signal and the second control signal are at a low-level, the power supply signal is not received in the first light-emitting control component, the second light-emitting control component and the third light-emitting control component, the third scan signal is at a low-level, the first reset sub-circuit is switched off;

in a data-voltage writing phase, the first scan signal is at a high-level, the data voltage signal is received in the input component, the second scan signal is at a low-level, the compensation component is switched off, the first control signal and the second control signal are at a low-level, the power supply signal is not received in the first light-emitting control component, the second light-emitting control component and the third light-emitting control component, the third scan signal is at a low-level, the first reset sub-circuit is switched off;

in a first light-emitting phase, the first scan signal is at a low-level, the data voltage signal is not received in the input component, the second scan signal is at a high-level, the compensation component is switched on, the third scan signal is at a low-level, the first reset sub-circuit is switched off, the first control signal is at a high-level, the power supply signal is received in the first light-emitting control component and the second light-emitting control component and transmitted to the first light-emitting element, the first light-emitting element is driven to emit light, the second control signal is at a low-level and the power supply signal is not received in the third light-emitting control component; and in a second light-emitting phase, the first scan signal is at a low-level, the data voltage signal is not received in the input component, the second scan signal is at a high-level, the compensation component is switched on, the third scan signal is at a low-level, the first reset sub-circuit is switched off, the first control signal of the first light-emitting control component is at a high-level, the first control signal of the second light-emitting control component is at a low-level, and the power supply signal is not received in the second light-emitting control component, the second control signal of the third light-emitting control component is at a high-level, the power supply signal is received in the third light-emitting control component and transmitted to the second light-emitting element, and the second light-emitting element is driven to emit light.

* * * * *